(12) United States Patent
Osawa et al.

(10) Patent No.: US 11,012,127 B2
(45) Date of Patent: May 18, 2021

(54) APPARATUS AND RADIO COMMUNICATION METHOD

(71) Applicant: NTT DOCOMO, INC., Tokyo (JP)

(72) Inventors: Ryosuke Osawa, Tokyo (JP); Hiroki Harada, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/612,644

(22) PCT Filed: May 12, 2017

(86) PCT No.: PCT/JP2017/018118
§ 371 (c)(1),
(2) Date: Nov. 11, 2019

(87) PCT Pub. No.: WO2018/207373
PCT Pub. Date: Nov. 15, 2018

(65) Prior Publication Data
US 2020/0099422 A1    Mar. 26, 2020

(51) Int. Cl.
*H04B 7/02* (2018.01)
*H04B 7/0456* (2017.01)
*H04B 7/06* (2006.01)
*H04B 7/08* (2006.01)

(52) U.S. Cl.
CPC ......... *H04B 7/0456* (2013.01); *H04B 7/0695* (2013.01); *H04B 7/088* (2013.01)

(58) Field of Classification Search
CPC ..... H04B 7/0456; H04B 7/0695; H04B 7/088

USPC ......................................................... 375/267
See application file for complete search history.

(56) References Cited

U.S. PATENT DOCUMENTS

| | | | |
|---|---|---|---|
| 2009/0046570 A1* | 2/2009 | Sarkar ................. | H04B 7/0417 370/203 |
| 2010/0322176 A1* | 12/2010 | Chen ..................... | H04L 5/0057 370/329 |
| 2013/0121386 A1* | 5/2013 | Hoshino .............. | H04B 7/0408 375/219 |
| 2016/0285583 A1* | 9/2016 | Kasher ................. | H04L 1/0001 |
| 2017/0048826 A1* | 2/2017 | Kishiyama ........... | H04W 72/04 |
| 2017/0171876 A1* | 6/2017 | Tavildar ............... | H04B 7/0626 |
| 2018/0041318 A1* | 2/2018 | Sudo .................... | H04L 1/0003 |
| 2018/0123648 A1* | 5/2018 | Nagaraja ............... | H04B 17/15 |
| 2018/0220416 A1* | 8/2018 | Islam ................... | H04B 7/0639 |

(Continued)

OTHER PUBLICATIONS

International Search Report issued in PCT/JP2017/018118 dated Aug. 1, 2017 (2 pages).

(Continued)

*Primary Examiner* — Helene E Tayong
(74) *Attorney, Agent, or Firm* — Osha Bergman Watanabe & Burton LLP

(57) ABSTRACT

The apparatus according to one aspect of the present invention communicates using beams, and has a receiving section that receives information about a beam of another apparatus, and a control section that decides whether or not to select a transmitting beam autonomously, based on whether certain information is present or not. According to one aspect of the present invention, even when certain apparatus is capable of selecting beams autonomously, it is still possible to reduce the decline in communication throughput and so forth.

7 Claims, 10 Drawing Sheets

(56) References Cited

U.S. PATENT DOCUMENTS

2018/0241452 A1* 8/2018 Akkarakaran ....... H04B 7/0617
2018/0310283 A1* 10/2018 Deenoo ............... H04W 72/042
2020/0077379 A1* 3/2020 Miller ................. H04W 72/044

OTHER PUBLICATIONS

Written Opinion of the International Searching Authority issued in PCT/JP2017/018118 dated Aug. 1, 2017 (3 pages).
Samsung; "CSI acquisition for UL NR MIMO"; 3GPP TSG RAN WG1 Meeting #86bis, R1-1609088; Lisbon, Portugal; Oct. 10-14, 2016 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36300 version 8.12.0 Release 8)"; Apr. 2010; (153 pages).

* cited by examiner

APPARATUS AND RADIO COMMUNICATION METHOD

TECHNICAL FIELD

The present invention relates to apparatus and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rel. 10, 11, 12 and 13) has been standardized for the purpose of achieving increased capacity and enhancement beyond LTE (LTE Rel. 8 and 9) and so on.

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), a user terminal (UE (User Equipment)) may apply precoding to transmitting signals, per transmitting antenna, based on precoding matrix indicators (PMIs) given as feedback from the network (for example, a base station (eNB (eNode B))), and transmit these signals.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), studies are in progress to use beamforming (BF) for both transmission and receipt primarily for the purpose of making it less difficult to secure coverage even when the carrier frequency increases, and reducing the propagation loss of radio waves.

As for the method of selecting beams, 2 types of operations may be possible—that is, either UE makes self-directed selections, or a base station makes selections and sends commands to the UE. In the former case, if the UE is allowed to freely select the transmitting beam without taking into account what beam control is implemented on the gNB side, the situation might occur where inadequate beams are selected. In this case, the quality of communication, communication throughput and so forth may deteriorate unexpectedly.

It is therefore an object of the present invention to provide apparatus and a radio communication method, whereby, even when certain apparatus is allowed to select beams autonomously, it is possible to reduce the decline in communication throughput and so forth.

Solution to Problem

The apparatus according to one aspect of the present invention communicates using beams, and this apparatus has a receiving section that receives information about a beam of another apparatus, and a control section that decides whether or not to select a transmitting beam autonomously, based on whether certain information is present or not.

Advantageous Effects of Invention

According to the present invention, even when certain apparatus is allowed to select beams autonomously, it is possible to reduce the decline in communication throughput and so forth.

DESCRIPTION OF EMBODIMENTS

Figure 1A:
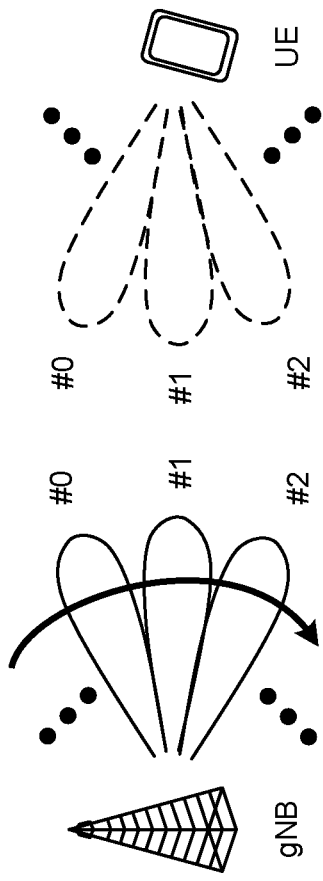
FIGS. 1A to 1C are diagrams to show examples of improper UE beam selections in the event UE centricity applies.

Envisaging future radio communication systems (for example, NR), studies are in progress to use beamforming (BF) for both transmission and receipt, primarily for the purpose of making it less difficult to secure coverage even when the carrier frequency increases, and reducing the propagation loss of radio waves.

Assuming that a very large number of antenna elements are used, BF refers to the technique of forming beams (antenna directivities) by, for example, adjusting the amplitude and/or the phase of signals transmitted/received in each element (this process may be also referred to as "precoding"). Note that such MIMO (Multiple Input Multiple Output) to use a very large number of antenna elements is also referred to as "massive MIMO."

BF can be classified into digital BF and analog BF. Digital BF refers to a method for performing precoding signal processing on baseband (digital signal), and a number of beams to match the number of antenna ports (or RF chain) can be formed at any given timing.

Analog BF refers to a method to use a phase shifter on RF (Radio Frequency). In this case, since it is only necessary to rotate the phase of RF signals, analog BF can be realized with simple and inexpensive configurations, but it is still not possible to form a plurality of beams at the same timing.

Note that it is also possible to implement hybrid BF configurations that combine digital BF and analog BF. Forming a large number of beams by using digital BF alone is likely to lead to expensive circuit structures, so that hybrid BF may be suitable especially for large-scale MIMO.

Envisaging NR, studies are underway to allow both a base station (which may be referred to as a "BS," "transmission/reception point (TRP)," an "eNB (eNode B)," a "gNB" and so forth) and UE to form transmitting/receiving beams and achieve gain.

Reciprocity-based transmission and non-reciprocity-based transmission are under study as methods of selecting beams. In the former case, the transmitting end selects transmitting beams (and/or transmitting beam candidates) based on signal measurement results transmitted from the receiving end. For example, if the transmitting end is UE and the receiving end is a gNB, in reciprocity-based transmission, the UE may select a transmitting beam based on a signal (for example, a reference signal) that is transmitted from the gNB.

Note that the "measurement" in the present specification may refer to the measurement of at least one of RSRP (Reference Signal Received Power), RSRQ (Reference Signal Received Quality), RSSI (Received Signal Strength Indicator), SINR (Signal to Interference plus Noise Ratio), SNR (Signal to Noise Ratio), path loss, interference power and so forth, or refer to measurement for determining other power and/or quality-related indicators.

The signals to use in the above measurement may include, for example, cell-specific reference signals (CRSs), channel state information-reference signals (CSI-RSs), measurement reference signals (such as sounding reference signals (SRSs)) and so forth, or reference signals that are defined apart from these (for example, beam-specific reference signals (BRSs), which are beam-specific (which vary per beam)) may be used.

In the event of non-reciprocity-based transmission, the receiving end transmits a signal (information) that specifies a beam for the transmitting end, and the transmitting end uses the specified beam. For example, the codebook transmission (codebook-based transmission) used in existing LTE (Rel. 8 to 13) and the like corresponds to non-reciprocity-based transmission.

The mode in which UE selects beams autonomously, as mentioned earlier in connection with reciprocity-based transmission, may be referred to as "UE centricity," "UE-centric mode," "UE-initiated control," and so on. In UE-centric operation, the UE may select transmitting beams and/or receiving beams for use, in a self-directed way.

In UE-centric operation, the gNB may operate so as to assist the selection of beams in the UE. It then follows that UE-centric operation may be referred to as "gNB-assisted mode," "gNB-aided mode," and so on.

In addition, as mentioned earlier in connection with non-reciprocity-based transmission, the mode in which beams are selected autonomously by the gNB and reported to the UE may be referred to as "gNB centricity," "gNB centric mode," "gNB-initiated control," "BS centricity" and the like.

In gNB-centric operation, information related to transmitting beams and/or receiving beams (for example, information that indicates (specifies) beams) may be reported from the gNB to the UE. The information related to transmitting/receiving beams may be reported by using higher layer signaling (for example, RRC (Radio Resource Control) signaling, MAC (Medium Access Control) signaling (for example, MAC CE (Control Element)), broadcast information, etc.), physical layer signaling (for example, downlink control information (DCI), uplink control information (UCI), etc.) and so on, or a combination of these.

Note that, in this specification, beams are distinguished (differences between multiple beams are judged) based on, but not limited to, at least one of following (1) to (8): (1) resources (for example, the time and/or frequency resources, the number of resources, etc.); (2) antenna ports (for example, the port index of the DMRS (DeModulation Reference Signal) and/or the measurement reference signal (SRS (Sounding Reference Signal), the number of ports, resources corresponding to ports, etc.); (3) precoding (for example, whether or not precoding is applied, precoding weight, etc.); (4) transmission power; (5) phase rotation; (6) beam widths; (7) beam angles (for example, tilt angle); and (8) the number of layers.

Also, the term "beam" as used herein may be used interchangeably with at least one of (1) to (8) listed above, and, for example, a "beam" may be interpreted as meaning a "resource," an "antenna port," a "DMRS port," an "SRS port," a "reference signal antenna port" and so on. Also, a "beam" may be interpreted as meaning a "transmitting beam and/or a receiving beam."

In UE-centric operation, it is not necessary to report information related to transmitting beams and/or receiving beams (for example, BIs, TPMIs and so on, which have been mentioned earlier) from the gNB to the UE, so that the overhead can be reduced. On the other hand, although gNB-centric operation requires overhead to report beams for UEs, it is effective to control interference, ensure robustness and so on.

Now, for NR, research is underway to switch between UE centricity and gNB centricity appropriately for the purpose of controlling beams in a flexible manner. For example, it may be possible to determine which centricity is used, based on whether UE has received a report of information specifying the beam for the UE.

However, if the UE selects transmitting beams autonomously, it is preferable to also take into account the gNB's receiving beams. For example, if the gNB uses analog BF (including hybrid BF), which transmitting beams are suitable for the UE may vary depending on the gNB's receiving beams.

If the gNB uses analog BF, the gNB may perform beam sweeping at least in the time direction. Beam sweeping is a method of switching between and transmitting a plurality of beams (for example, multiple beams of varying directivities) between different time fields and/or different frequency fields.

Consequently, when the gNB uses analog BF, it is likely that the gNB's beams are directed to a given UE only in specific time slots, and which transmitting beams are optimal for the UE changes over time. Therefore, allowing the UE to select transmitting beams freely without considering the beams used on the gNB side may have a risk of an unexpected decline in communication quality, a decline in communication throughput and so on.

Figure 1B:
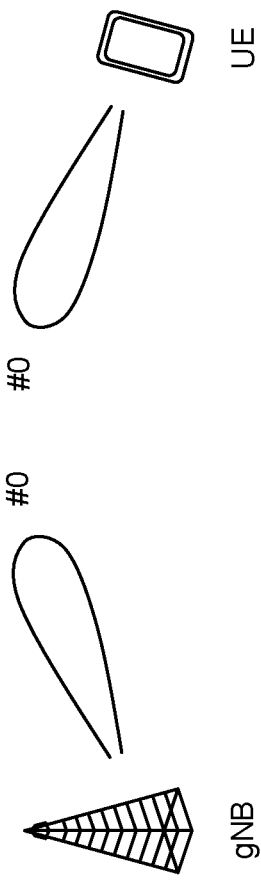
Figure 1C:
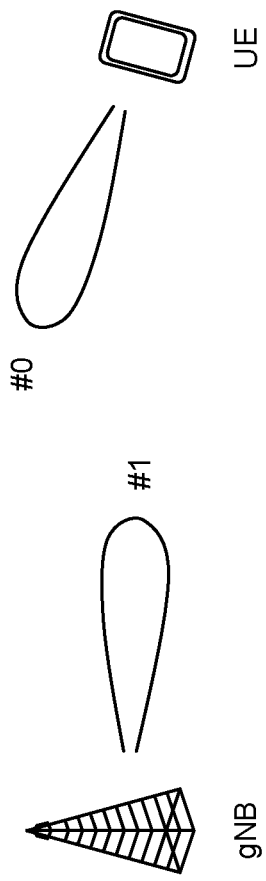

This problem will be explained in detail below with reference to FIGS. 1A to 1C. FIGS. 1A to 1C are diagrams to show examples of improper UE beam selections in the event UE centricity applies. FIG. 1A shows examples of gNB beams and UE beams. In this example, the gNB sweeps beams (gNB beams #0, #1, #2, . . . ) in time based on analog BF. Meanwhile, the UE operates on a UE-centric basis, and uses transmitting beams selected from beam candidates (UE beams #0, #1, #2, . . . ).

For example, suppose that the UE judges that UE beam #0 is suitable, based on gNB beam #0 transmitted from the gNB at a certain timing (see FIG. 1B). However, if the gNB beam moves onto the next beam (gNB beam #1), it may not be preferable to continue using UE beam #0 (see FIG. 1C).

In view of the points described above, the present inventors have paid special attention to the fact that, when UE performs reciprocity-based transmission, the gNB and the UE need to have a shared understanding of which beam (and/or time-frequency resource) accommodates the downlink signal based on which the UE should select beams.

So the present inventors have come up with the idea of specifying which gNB beams are to be assumed in UE-centric beam selection, by specifying gNB beams to the UE, and, by this means, commanding UE-centric operations. According to one example of the present invention, for example, the UE can activate UE-centric operation only if gNB beams can be specified.

Now, embodiments of the present invention will be described in detail below with reference to the accompanying drawings. The radio communication methods according to the herein-contained embodiments may be applied alone or may be applied in combination.

Also, the following embodiments will show examples of selecting uplink transmitting beams for use for transmitting data (for example, an uplink shared channel (PUSCH (Physical Uplink Shared CHannel))). In other words, examples in which the PUSCH is the channel subject to beam selection will be described below. However, as will be described later, the present invention is by no means limited to these. Also, a "channel" may be interpreted as meaning a "signal."

Note that, in the following embodiments, UE centricity may be interpreted as reciprocity-based transmission, and gNB centricity may be interpreted as non-reciprocity-based transmission.

(Radio Communication Method)

First Embodiment

With a first embodiment of the present invention, UE centricity and gNB centricity are reported implicitly based on whether or not a gNB beam (and/or the reference signal transmitted in this gNB beam) is specified.

Figure 2:
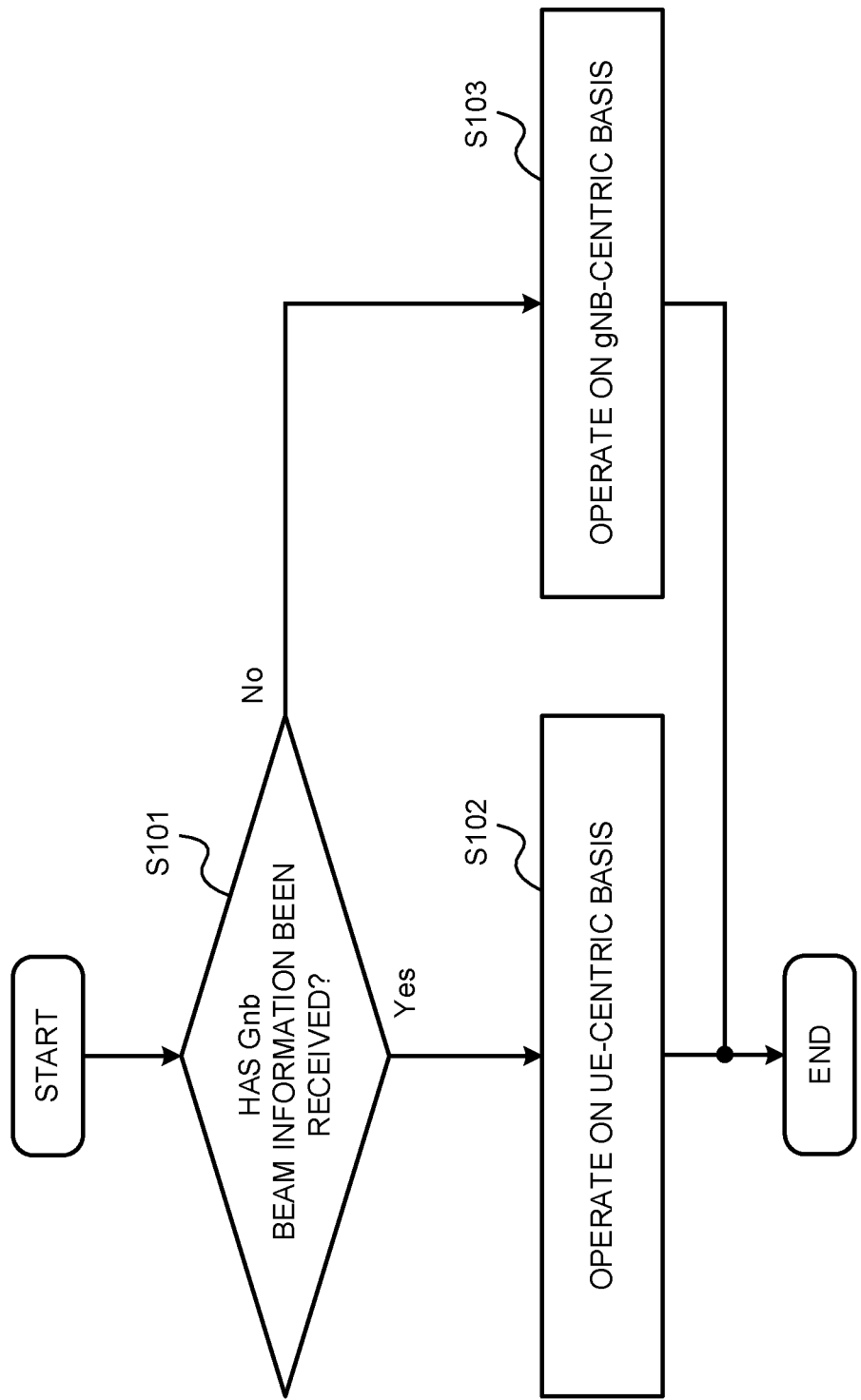
FIG. 2 is a diagram to show an example of a flowchart for judging centricity, according to a first embodiment of the present invention.

FIG. 2 is a diagram to show an example of a flowchart for judging centricity, according to a first embodiment of the present invention. UE judges whether information related to a gNB beam (and/or the reference signal transmitted in this gNB beam) has been received (the information may be referred to as "gNB beam information") (step S101).

Then, based on this gNB beam information, the UE chooses between UE centricity and gNB centricity. To be more specific, when the UE receives gNB beam information (step S101: Yes), the UE operates on a UE-centric basis (for example, selects transmitting beam) (step S102). On the other hand, when the UE receives no gNB beam information (step S101: No), the UE operates on a gNB-centric basis (step S103).

The gNB beam information may be reported by using at least one of a beam index (BI), a rank indicator (RI), a precoding matrix indicator (PMI), a TRI (Transmitted RI), a TPMI (Transmitted PMI), a certain reference signal's port index (for example, a DMRS port index (DPI), an SRS port index (SPI), etc.), a certain reference signal's resource indicator (for example, a CSI-RS resource indicator (CRI), a DMRS resource index (DRI), an SRS resource index (SRI), etc.), QCL information (Quasi-Co-Location), beam pair link information (BPL) and so forth.

Note that QCL means that the pseudo geographical relationship is identical (can be regarded as being identical). For example, considering the geographical locations of individual transmission points (channel characteristics of downlink signals transmitted from individual transmission points), if different antenna ports share the same long-term channel characteristics, these antenna ports may be assumed to be quasi-co-located (QCL).

The QCL information may be information to allow assuming that a given signal, channel or antenna port is quasi-co-located (QCL) with another signal, channel or antenna port. The UE may assume that the same beam is applied to multiple signals (channel/antenna ports), based on the QCL information.

The BPL information is information to represent transmitting/receiving beam pairs (pairs of transmitting beams used on the transmitting end (for example, UE) and receiving beams used on the receiving end (for example, gNB)), and may show, for example, beam pair indices (BPIs) that are associated with BPLs. The UE may specify gNB beams corresponding to UE beams, based on the BPL information that is reported.

If gNB beam information is reported, the UE may judge that a gNB beam is specified, and the UE may select a transmitting beam on a UE-centric basis based on the gNB beam that is specified, until another piece of gNB beam information.

Also, the gNB beam information may include information about multiple gNB beams for use at different times (in different periods). In the event UE-centric control is implemented, the UE may select the transmitting beam for use at a certain time based on the gNB beam used at that time.

On the other hand, when no gNB beam information is reported, the UE may judge that no gNB beam is specified, or, when specific information is reported (for example, if a certain index or indicator reported shows a specific value (for example, #0)), the UE may judge that no gNB beam is specified.

The gNB beam information may be reported from the gNB to the UE by using higher layer signaling (for example, RRC signaling, MAC signaling, broadcast information (MIB and SIB), etc.), physical layer signaling (for example, DCI) or a combination of these.

For example, the gNB beam information may be included and reported in DCI for scheduling receipt of DL data (this DCI may include DCI format 1/2 and others, and may be referred to as "DL assignment"), or in DCI for scheduling transmission of UL data (this DCI may include DCI format 0/4 and others, and may be referred to as "UL grant").

By including gNB beam information in a UL grant, when the UE transmits data as commanded by that UL grant, the UE can select the transmitting beam by taking into account the gNB beam information. Meanwhile, when gNB beam information is reported in information/signal other than a UL grant, the cycle for reporting gNB beam information can be extended, so that the signaling overhead pertaining to the reporting of this information can be reduced.

Note that, in this specification, terms such as "DL assignment," "UL grant," and others indicate that these DCIs and formats are the same or similar, and, in one embodiment of the present invention, these DCIs do not necessarily have to command data scheduling.

Then, based on the difference of DCI format that is received, the UE chooses between UE centricity and gNB centricity. For example, when the UE controlling UL transmission by using UL grants of a certain DCI format receives a UL grant of another DCI format, the UE may switch between UE centricity and gNB centricity.

According to the first embodiment described above, it is possible to activate UE-centric operation only if gNB beams can be specified.

Second Embodiment

With a second embodiment of the present invention, UE centricity and gNB centricity are reported implicitly based on whether a gNB beam is specified or a UE beam is specified. That is, even if no gNB beam is specified, UE chooses between UE centricity and gNB centricity based on the UE beam specified.

Figure 3:
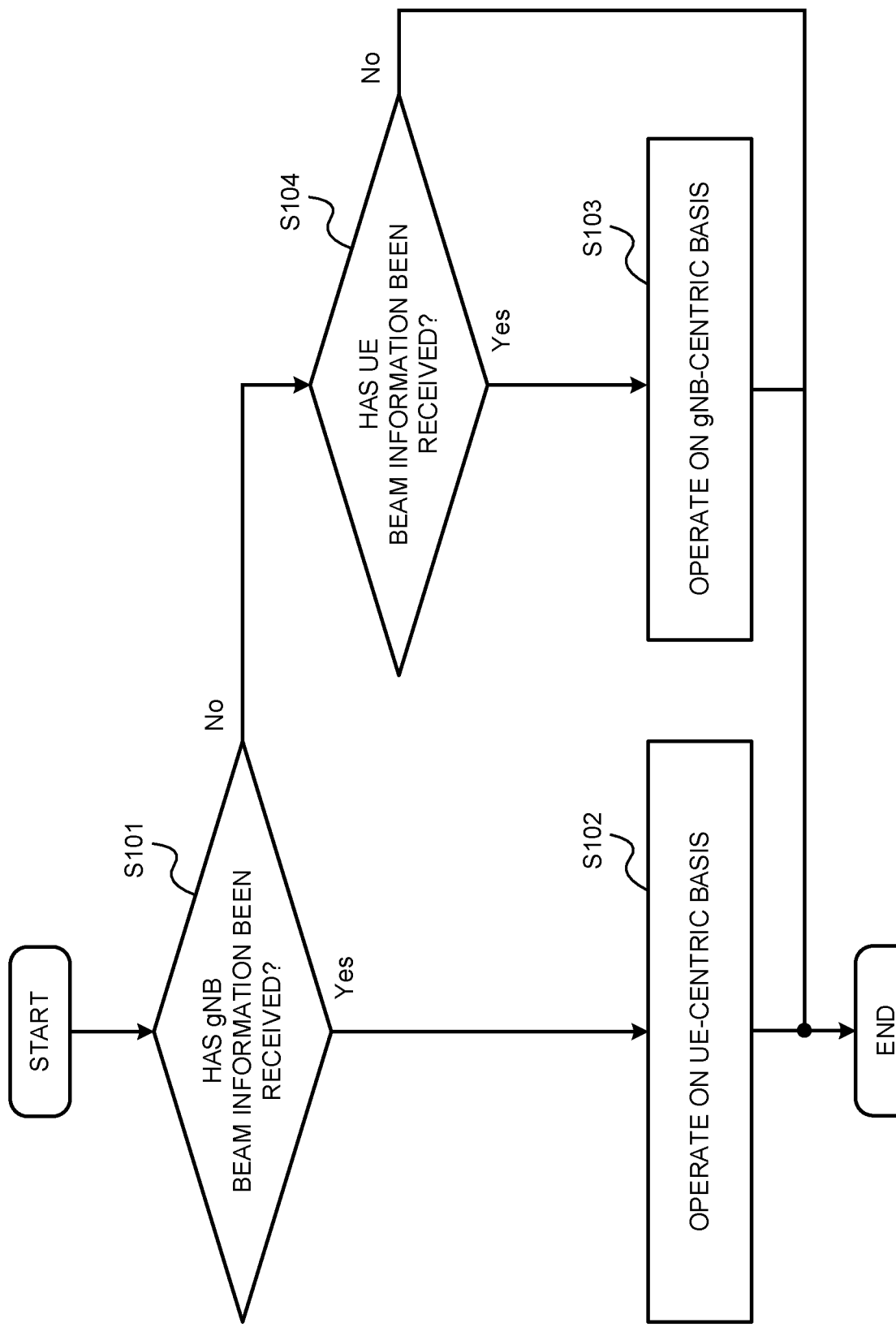
FIG. 3 is a diagram to show an example of a flowchart for judging centricity, according to a second embodiment of the present invention.

FIG. 3 is a diagram to show an example of a flowchart for judging centricity, according to the second embodiment of the present invention. Steps S101 to S103 may be the same as in FIG. 2, and therefore their description will be omitted.

The example of FIG. 3 is different from the example of FIG. 2 in that, when UE receives no gNB beam information (step S101: No), the UE may further judge whether information related to a UE beam (and/or the reference signal transmitted in that UE beam) has been received (this information may be also referred to as "UE beam information") (step S104). Note that the order of steps S101 and S104 may be reversed.

When the UE receives UE beam information (step S104: Yes), the UE operates on a gNB-centric basis (step S103). Note that, if neither gNB beam information nor UE beam information is received (step S104: No), the UE may operate on a UE-centric basis, or the UE may be controlled to communicate using certain beams.

The gNB beam information and the UE beam information may each be reported by using at least one of a BI, an RI, a PMI, a TRI, a TPMI, a certain reference signal's port index (for example, an SPI), a certain reference signal's resource indicator (for example, a CRI), QCL information, BPL information and so forth.

If gNB beam information is reported, the UE may judge that UE centricity applies, and, when UE beam information is reported, the UE may judge that gNB centricity applies. Furthermore, the UE may judge that gNB centricity applies when no gNB beam information is reported, and judge that UE centricity applies when no UE beam information is reported.

The gNB beam information and the UE beam information may be reported, from the gNB to the UE, by using higher layer signaling (for example, RRC signaling, MAC signaling, broadcast information (MIB and SIB), etc.), physical layer signaling (for example, DCI), or a combination of these.

One of gNB beam information and UE beam information may be reported using the same type of signal and/or channel. For example, gNB beam information and UE beam information may be reported using DCI (hereinafter also referred to as "gNB/UE beam-specifying DCI") of the same DCI format. The gNB/UE beam-specifying DCI may include information to indicate which beam of the gNB or the UE is specified, and this information may be represented by, for example, a 1-bit field.

If gNB beam information and UE beam information are represented by the same type of index or indicator (for example, BI), it may be assumed that part of the candidates for the index or indicator corresponds to gNB beams, and the rest of the candidates correspond to UE beams. For example, if indices #0 to #7 are used for gNB beam information and UE beam information, the UE may judge that indices #0 to #3 correspond to gNB beams, and that indide #4 to #7 correspond to UE beams.

Also, the gNB/UE beam-specifying DCI may include cyclic redundancy check (CRC) bits that are masked (scrambled) using certain indicators (for example, network temporary identifiers (RNTIs (Radio Network Temporary Identifiers))). According to this configuration, the UE can properly distinguish between gNB/UE beam-specifying DCIs.

Note that the CRC bits of DCI carrying gNB beam information and the CRC bits of DCI carrying UE beam information may be masked using the same indicator, or may be masked using different indicators. The above indicators applied to DCI carrying gNB beam information and/or DCI carrying UE beam information may be configured by, for example, higher layer signaling.

Also, the UE may judge whether a gNB beam or a UE beam is specified based on the difference of the received DCI format. For example, when the UE controlling UL transmission by using UL grants of a certain DCI format receives a UL grant of another DCI format, the UE may switch between UE centricity and gNB centricity.

According to the second embodiment described above, for example, UE can judge whether a beam designated by a gNB is a gNB beam or a UE beam, so that it is possible to control centricity properly.

Third Embodiment

With a third embodiment of the present invention, either UE centricity or gNB centricity is reported explicitly.

A case might occur in which a gNB beams is separately reported by using a CRI or the like, for a specific use (for example, downlink quality measurement for mobility management). In this case, although gNB beam information is reported, this does not necessarily mean that UE has reciprocity (and/or that the UE should operate on a UE-centric basis).

With the third embodiment, centricity is specified apart from gNB beams, so that centricity can be controlled without being limited to gNB beam information that is reported.

Figure 4:
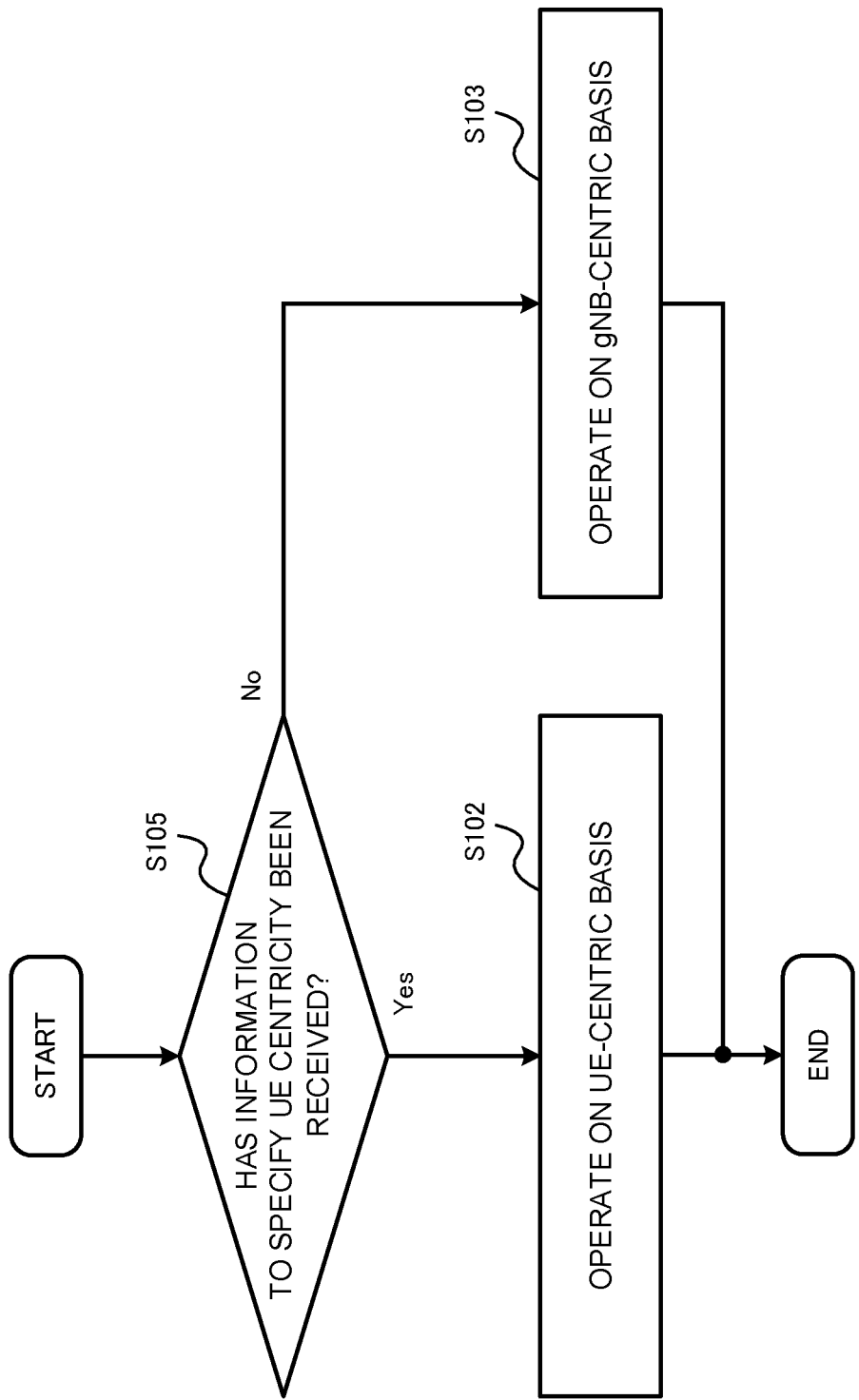
FIG. 4 is a diagram to show an example of a flowchart for judging centricity, according to a third embodiment of the present invention.

FIG. 4 is a diagram to show an example of a flowchart for judging centricity, according to a third embodiment of the present invention. In FIG. 4, step S105 is defined instead of step S101 in FIG. 2. In step S105, the UE judges whether information to specify UE centricity has been received (step S105).

To be more specific, when the UE receives information that specifies UE centricity (step S105: Yes), the UE operates on a UE-centric basis (for example, selects transmitting beam) (step S102). On the other hand, when the UE does not receive information that specifies UE centricity (step S105: No), the UE operates on a gNB-centric basis (step S103).

Note that the phrase "information to specify UE centricity is received (not received)" in the above steps may be interpreted as meaning that "information to specify gNB centricity is not received (received).

The information to specify UE centricity and the information to specify gNB centricity may be simply referred to as "centricity-specifying information." The centricity-specifying information may be, for example, 1-bit information, where "1" specifies UE centricity and "0" specifies gNB centricity. Note that these may be reversed.

According to the third embodiment described above, centricity schemes are reported to UE explicitly, so that it is possible to control centricity properly.

(Variations)

The above-described embodiments have assumed that transmitting beams selected by UE in a self-directed way are used to transmit data (PUSCH), but this is by no means limiting. For example, UE transmitting beams may be used to transmit other uplink signals (for example, SRS) and/or channels (for example, an uplink control channel (PUCCH (Physical Uplink Control CHannel)), random access channels (PRACH (Physical Random Access CHannel), etc.)).

Also, the above-described embodiments may be applied independently or applied in common, depending on the type and/or use of each signal (for example, a signal may be for use for control (such PUCCH), for random access procedures (PRACH), for data transmission (PUSCH) and so on). For example, if certain gNB beam information is reported, the UE may autonomously select the transmitting beam for the PUSCH, while not selecting the transmitting beam for the PUCCH autonomously. Also, the beam to select in each centricity needs not be a transmitting beam, and may be a receiving beam as well.

Note that the UE beam selection described with the above embodiments may be interpreted as gNB beam selection. For example, the UEs and gNBs in the above description may be interpreted as being interchangeable. Also, in that case, the uplink and the downlink may be interpreted as being interchangeable, so that reciprocity-based transmission may correspond to gNB centricity (gNB beams are selected autonomously by gNBs), and non-reciprocity-based transmission may correspond to UE centricity.

Also, for example, when a gNB works in single-beam operation, the gNB's receiving beam does not change, so that it is likely that UE-centric operation can be implemented properly even without gNB beam information. Even when the gNB does not use analog BF (and uses full-digital BF), the gNB can try receipt by using multiple receiving beams simultaneously, so that it is expected that UE-centric operation can be implemented properly even without gNB beam information.

Therefore, information as to based on which one of the above-described embodiments control is implemented may be reported from the gNB to UE via higher layer signaling (for example, RRC signaling) or the like. When information to indicate that control is not implemented based on the herein-contained embodiments is reported, the UE may switch between gNB centricity and UE centricity even when no gNB beam information is provided.

Also, information about the BF (digital BF, analog BF, hybrid BF, etc.) used by the gNB may be reported to the UE through higher layer signaling and the like, and the UE may decide based on which one of the herein-contained embodiments the UE should implement control, based on this information. For example, when the UE recognizes that the gNB uses analog BF (or hybrid BF) from this information, the UE may decide to implement control based on one of the herein-contained embodiments.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 5:
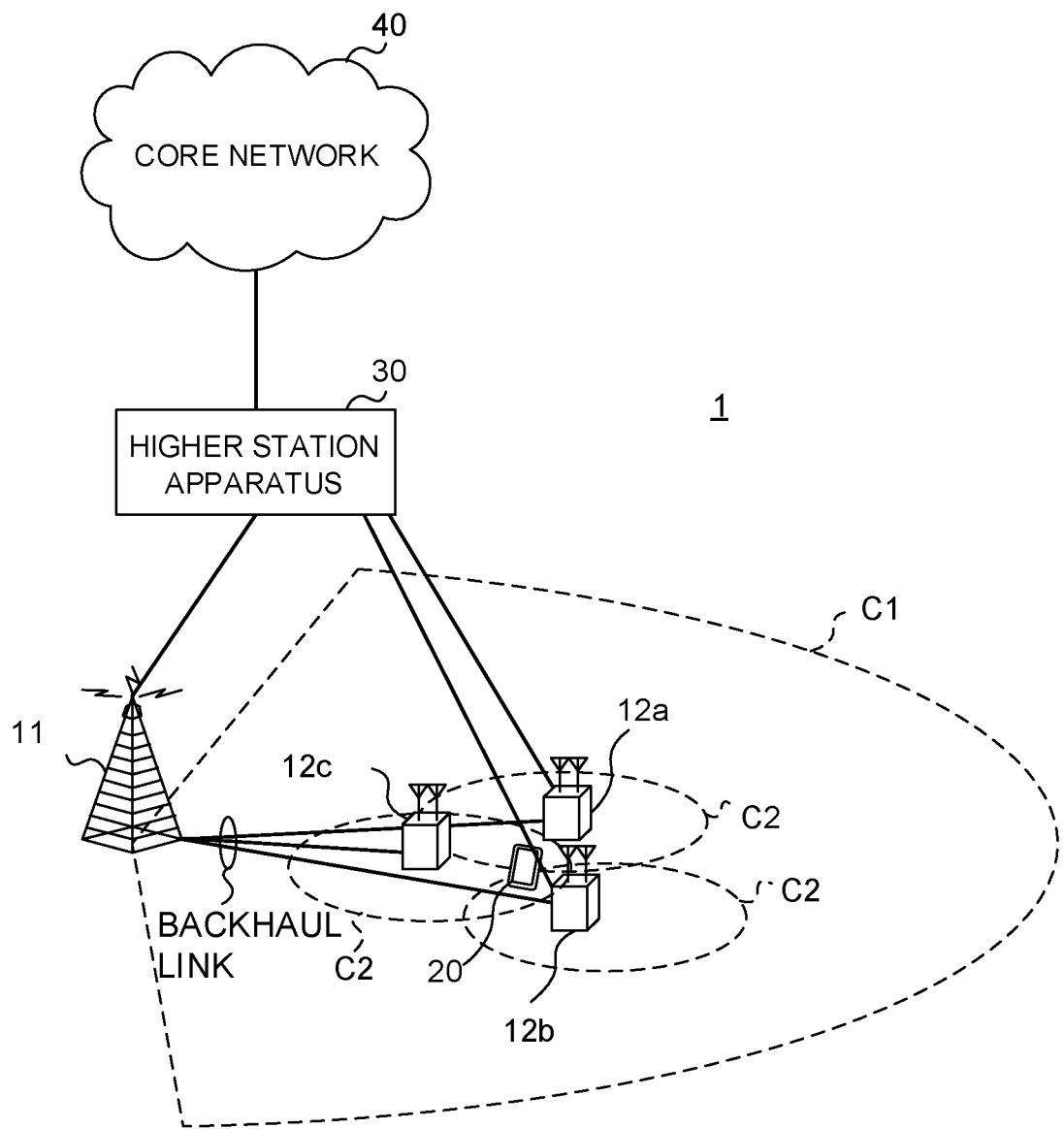
FIG. 5 is a diagram to show an exemplary schematic structure of a radio communication system according to one embodiment of the present invention.

FIG. 5 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)" and so on, or may be seen as a system to implement these.

The radio communication system 1 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. The arrangements and the number of cells and user terminals 20 are not limited to the examples illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminal 20 can communicate using time division duplexing (TDD) and/or frequency division duplexing (FDD) in each cell. Furthermore, in each cell (carrier), a single numerology may be employed, or a plurality of different numerologies may be employed.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. The PDCCH communicates, for example, downlink control information (DCI) that includes PDSCH and/or PUSCH scheduling information, and so on.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 6:
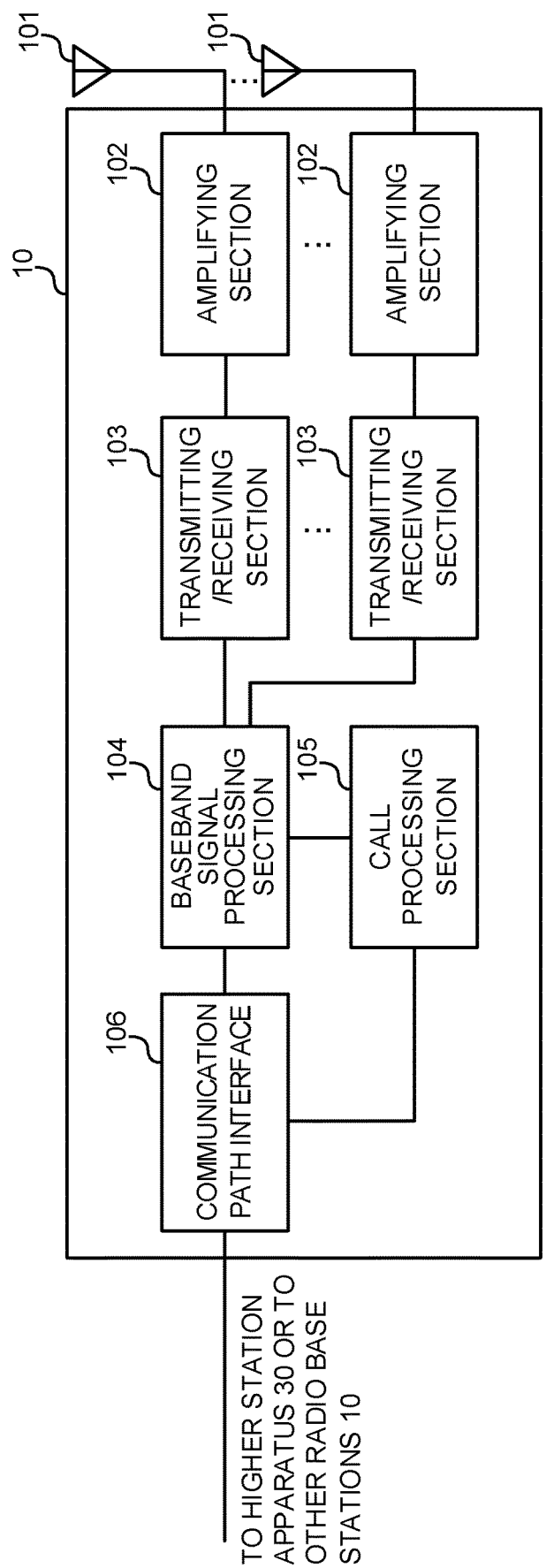
FIG. 6 is a diagram to show an exemplary overall structure of a radio base station according to one embodiment of the present invention.

FIG. 6 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit signals using transmitting beams, or receive signals using receiving beams. Transmitting/receiving sections 103 may transmit and/or receive signals using certain beams determined by control section 301.

The transmitting/receiving sections 103 may transmit gNB beam information, UE beam information, centricity-specifying information and so forth, to the user terminal 20. Also, the transmitting/receiving sections 103 may receive gNB beam information, UE beam information, centricity-specifying information and so forth, from the user terminal 20.

Figure 7:
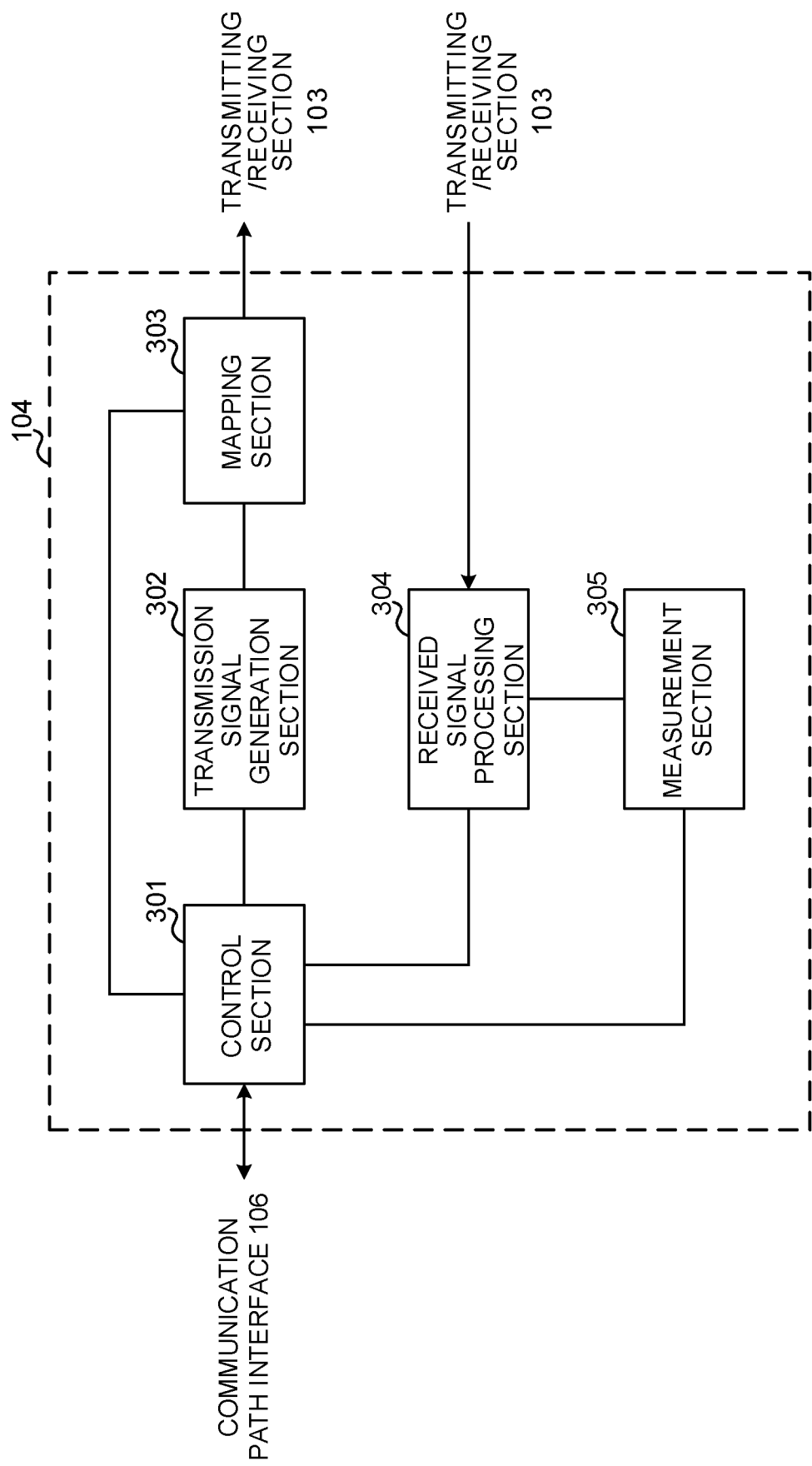
FIG. 7 is a diagram to show an exemplary functional structure of a radio base station according to one embodiment of the present invention.

FIG. 7 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDSCH and/or the EPDCCH, such as delivery acknowledgement information) and so on. Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may exert control so that transmitting beams and/or receiving beams are formed using digital BF (for example, precoding) in the baseband signal processing section 104 and/or analog BF (for example, phase rotation) in the transmitting/receiving sections 103. The control section 301 may exert control so that beams are formed based on downlink propagation path information, uplink propagation path information and so on. These pieces of propagation path information may be obtained from the received signal processing section 304 and/or the measurement section 305.

The control section 301 may exert control so that certain information (for example, gNB beam information, UE beam information, centricity-specifying information, etc.) is transmitted to the user terminal 20, to allow the user terminal 20 to decide whether or not to select transmitting beams autonomously (whether to operate on a UE-centric basis or on a gNB-centric basis).

The control section 301 may decide whether or not to select transmitting beams autonomously (whether to operate on a UE-centric basis or on a gNB-centric basis) based on whether certain information is present or not (for example, whether certain information has been received or not).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), propagation path information (for example, CSI), and so on. The measurement results may be output to the control section 301.

(User Terminal)

Figure 8:
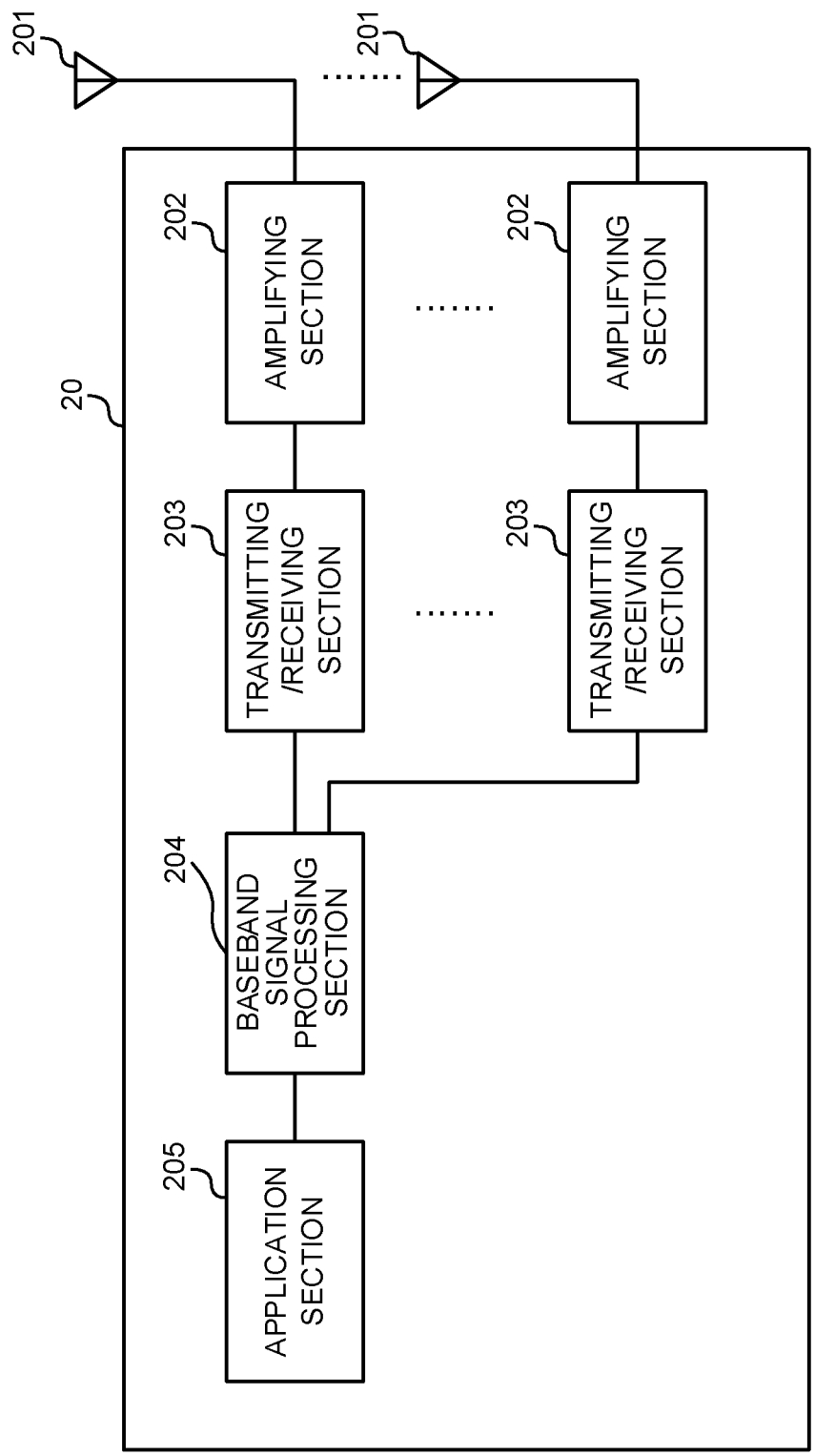
FIG. 8 is a diagram to show an exemplary overall structure of a user terminal according to one embodiment of the present invention.

FIG. 8 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 may transmit signals using transmitting beams, or receive signals using receiving beams. The transmitting/receiving sections 203 may transmit and/or receive signals using certain beams determined by control section 401.

The transmitting/receiving sections 203 may receive gNB beam information, UE beam information, centricity-specifying information and so forth, from the radio base station 10. The transmitting/receiving sections 203 may transmit gNB beam information, UE beam information, centricity-specifying information and so forth, to the radio base station 10.

Figure 9:
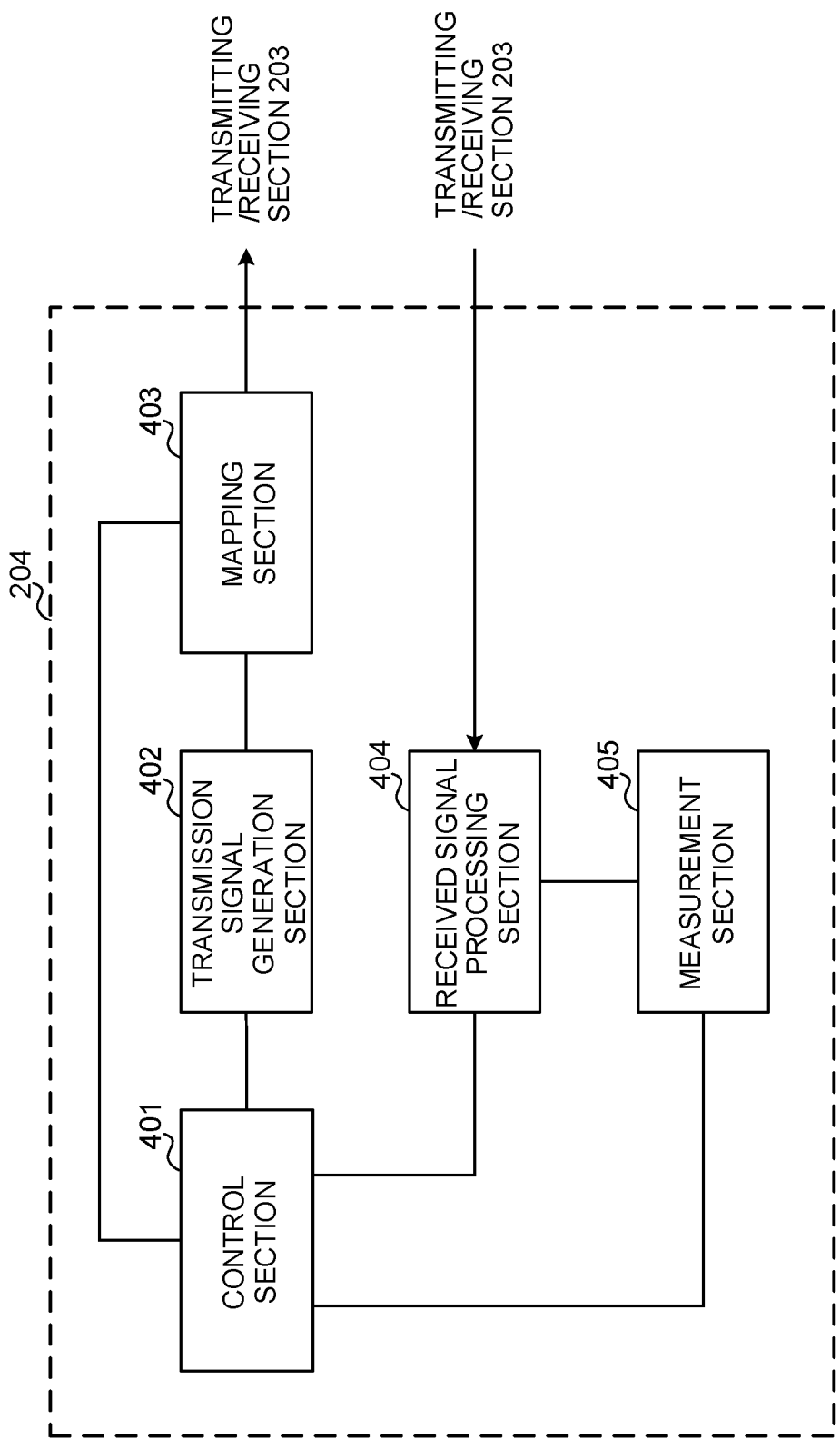
FIG. 9 is a diagram to show an exemplary functional structure of a user terminal according to one embodiment of the present invention.

FIG. 9 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed using digital BF (for example, precoding) in the baseband signal processing section 204 and/or analog BF (for example, phase rotation) in the transmitting/receiving sections 203. The control section 401 may exert control so that beams are formed based on downlink propagation path information, uplink propagation path information, and so on. These pieces of propagation path information may be obtained from the received signal processing section 404 and/or the measurement section 405.

The control section 401 may decide whether or not to select transmitting beams autonomously (whether to operate on a UE-centric basis or on a gNB-centric basis), based on whether certain information is present or not (for example, whether or not certain information has been received).

For example, the certain information may be information about another device's beams (for example, gNB beam information). In this case, when this information about another device's beams is received, the control section 401 may decide to select transmitting beams autonomously. Also, when the information about another device's beams is not received (for example, when UE beam information is received instead of gNB beam information), the control section 401 may decide not to select transmitting beams autonomously.

Furthermore, the above certain information may be information that specifies whether or not to select transmitting beams autonomously (for example, centricity-specifying information). In this case, even if the above-mentioned information about another device's beams is not received, the control section 401 decides whether or not to select transmitting beams autonomously based on whether the certain information is present or not.

The control section 401 may judge whether the certain information is present or not from the downlink control information format (DCI format). For example, the control section 401 may judge that the certain information is present when the received signal processing section 404 decodes DCI of DCI format X, and judge that the certain information is not present when the received signal processing section 404 decodes DCI of another DCI format Y.

Also, the control section 401 may exert control so that certain information (for example, gNB beam information, UE beam information, centricity-specifying information, etc.) is transmitted to the radio base station 10, to allow the radio base station 10 to decide whether to autonomously select transmitting beams or not (whether to operate on a UE-centric basis or on a gNB-centric basis).

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), propagation path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 10:
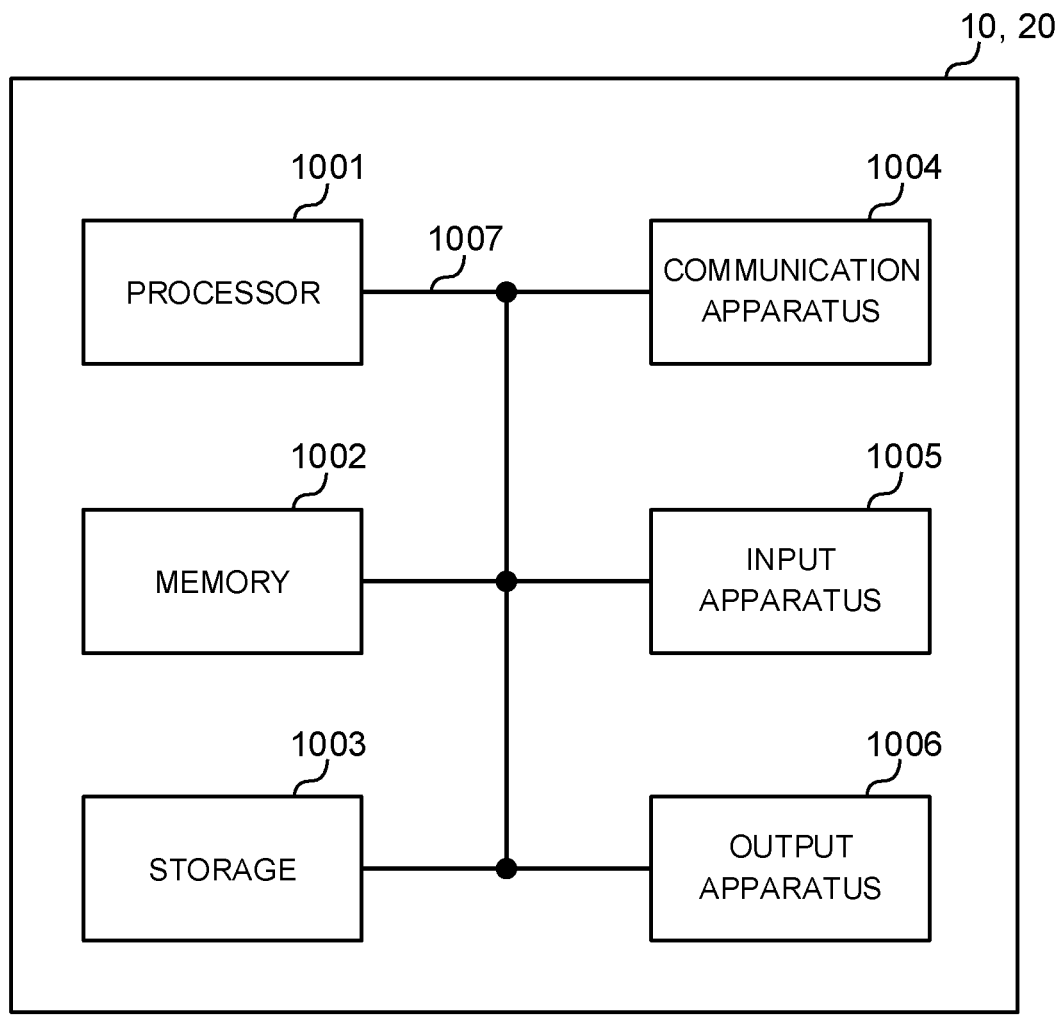
FIG. 10 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 10 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and the user terminal 20 is implemented by reading certain software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to one embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a mini slot and a symbol may be each called by other applicable names. For example, 1 subframe may be referred to as a "transmission time interval" (TTI), or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or more slots or one or more minislots) may be the minimum time unit of scheduling. Also, the number of slots (the number of mini-islots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," an "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe or a radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent implicitly (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
    a receiver that receives a first information about a resource for a reference signal; and
    a processor that, when receiving the first information about the resource for the reference signal, calculates, based on a measurement of the resource for the reference signal, a precoder for non-codebook-based transmission,
    wherein the receiver receives a plurality of the first information used in a plurality of periods, and
    wherein the processor calculates the precoder based on the resource that is used in a period of the plurality of periods.

2. The terminal according to claim 1,
    wherein the processor controls the non-codebook-based transmission when a second information that instructs to use the non-codebook-based transmission is received via higher layer signaling.

3. The terminal according to claim 2, further comprising:
    a transmitter that transmits a sounding reference signal (SRS) using the precoder.

4. The terminal according to claim 1, further comprising:
    a transmitter that transmits a sounding reference signal (SRS) using the precoder.

5. A radio communication method comprising:
    receiving a first information about a resource for a reference signal; and
    when receiving the first information about the resource for the reference signal, calculating, based on a measurement of the resource for the reference signal, a precoder for non-codebook-based transmission,
    wherein the method further comprises receiving a plurality of the first information used in a plurality of periods, and
    calculating the precoder based on the resource that is used in a period of the plurality of periods.

6. A base station comprising:
    a transmitter that transmits, to a terminal, a first information about a resource for a reference signal; and
    a processor that, when transmitting the first information about the resource for the reference signal to the terminal, assumes that the terminal calculates, based on a measurement of the resource for the reference signal, a precoder for non-codebook-based transmission,
    wherein the transmitter transmits a plurality of the first information used in a plurality of periods, and
    wherein the terminal further calculates the precoder based on the resource that is used in a period of the plurality of periods.

7. A system comprising a base station and a terminal, wherein:
    the base station comprises:
        a transmitter that transmits a first information about a resource for a reference signal; and
    the terminal comprises:
        a receiver that receives the first information; and
        a processor that, when receiving the first information about the resource for the reference signal, calculates, based on a measurement of the resource for the reference signal, a precoder for non-codebook-based transmission,
wherein the receiver receives a plurality of the first information used in a plurality of periods, and
wherein the processor calculates the precoder based on the resource that is used in a period of the plurality of periods.

* * * * *